United States Patent
Kita et al.

(10) Patent No.: US 10,605,350 B2
(45) Date of Patent: Mar. 31, 2020

(54) FLOW PATH STRUCTURE OF POWER TRANSMISSION DEVICE

(71) Applicant: Honda Motor Co., Ltd., Tokyo (JP)

(72) Inventors: Hiroyuki Kita, Saitama (JP); Toru Yamashita, Saitama (JP); Toyokazu Tsubono, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 19 days.

(21) Appl. No.: 15/919,228

(22) Filed: Mar. 13, 2018

(65) Prior Publication Data

US 2018/0266538 A1 Sep. 20, 2018

(30) Foreign Application Priority Data

Mar. 15, 2017 (JP) ................. 2017-050323

(51) Int. Cl.
*F16H 57/04* (2010.01)
*F16H 15/56* (2006.01)
(Continued)

(52) U.S. Cl.
CPC ......... *F16H 57/0423* (2013.01); *F16H 15/56* (2013.01); *F16H 57/029* (2013.01); *F16H 57/0402* (2013.01); *F16H 57/045* (2013.01); *F16H 57/0453* (2013.01); *F16H 57/0461* (2013.01); *F16H 57/0473* (2013.01);
(Continued)

(58) Field of Classification Search
CPC ........ F16H 3/66; F16H 15/56; F16H 57/0421; F16H 57/0423; F16H 57/0424; F16H 57/0402; F16H 57/045; F16H 57/0453; F16H 57/0461; F16H 57/0473; F16H 57/0483; F16H 2200/0069; F16H 2200/2012; F16H 2200/2046; F16H 2200/2048; F16H 2200/2066; F16H 2200/2082; F16H 2700/00
See application file for complete search history.

(56) References Cited

U.S. PATENT DOCUMENTS

| 7,823,696 B2 * | 11/2010 | Baba .............. F16H 57/0483 184/11.1 |
| 9,625,029 B2 * | 4/2017 | Vituri ............... F16H 57/029 |
| 10,072,749 B2 * | 9/2018 | Reth ............... F16H 57/0423 |

FOREIGN PATENT DOCUMENTS

| JP | 2011047433 | 3/2011 |
| JP | 2012241788 | 12/2012 |
| JP | 2014-119055 | 6/2014 |

OTHER PUBLICATIONS

"Office Action of Japan Counterpart Application," dated Oct. 23, 2018, with English translation thereof, p. 1-p. 6.

* cited by examiner

*Primary Examiner* — Leslie A Nicholson, III
(74) *Attorney, Agent, or Firm* — JCIPRNET

(57) ABSTRACT

Provided is a flow path structure of a power transmission device which is capable of removing gas from a lubricating fluid guided to a fluid reservoir while suppressing an increase in a size of the entire power transmission device. A gasket (63) has an extending portion which extends toward an inside of a transmission case (31). A flow path (70) which extends from an upper portion to a lower portion and guides lubricating oil discharged from a discharge mechanism (64) to an oil reservoir is formed inside the transmission case (31) using the extending portion. The discharge mechanism (64) discharges the lubricating oil toward an inner surface of the flow path (70).

5 Claims, 8 Drawing Sheets

(51) Int. Cl.
 *F16H 57/029* (2012.01)
 *F16H 3/66* (2006.01)
(52) U.S. Cl.
 CPC ........... *F16H 57/0483* (2013.01); *F16H 3/66* (2013.01); *F16H 57/0421* (2013.01); *F16H 57/0424* (2013.01); *F16H 2200/0069* (2013.01); *F16H 2200/2012* (2013.01); *F16H 2200/2046* (2013.01); *F16H 2200/2048* (2013.01); *F16H 2200/2066* (2013.01); *F16H 2200/2082* (2013.01); *F16H 2700/00* (2013.01)

|  | C1 | C2 | C3 | B1 | B2 | B3 | F1 | GEAR SHIFT RATIO | COMMON RATIO |
|---|---|---|---|---|---|---|---|---|---|
| Rvs |  |  | ○ |  | ○ |  | L | 4.008 |  |
| 1st |  |  |  | ○ | (○) |  | R/L | 5.233 | 1.554 |
| 2nd |  | ○ |  | ○ | ○ |  | R | 3.367 | 1.465 |
| 3rd |  |  | ○ | ○ | ○ |  | R | 2.298 | 1.348 |
| 4th |  | ○ | ○ | ○ |  |  | R | 1.705 | 1.251 |
| 5th | ○ |  | (○) | ○ |  |  | R | 1.363 | 1.363 |
| 6th | ○ | ○ | ○ |  |  |  | R | 1.000 | 1.273 |
| 7th | ○ |  | ○ |  | ○ |  | R | 0.786 | 1.196 |
| 8th | ○ | ○ |  |  | ○ |  | R | 0.657 | 1.126 |
| 9th | ○ |  |  |  | ○ | ○ | R | 0.584 | 1.120 |
| 10th | ○ | ○ |  |  |  | ○ | R | 0.520 |  |

FIG. 4

FLOW PATH STRUCTURE OF POWER TRANSMISSION DEVICE

CROSS-REFERENCE TO RELATED APPLICATION

This application claims the priority benefit of Japan application serial no. 2017-050323, filed on Mar. 15, 2017. The entirety of the above-mentioned patent application is hereby incorporated by reference herein and made a part of this specification.

BACKGROUND

Technical Field

The present disclosure relates to a flow path structure of a power transmission device which removes gas from a lubricating fluid guided to a fluid reservoir inside a casing of the power transmission device.

Related Art

Conventionally, as a power transmission device mounted in a vehicle or the like, there is a power transmission device including a transmission which shifts a speed of a driving force of an internal combustion engine and then outputs the driving force, a differential device which distributes the driving force output from the transmission to left and right driving wheels, and a transfer device which distributes the driving force transmitted to the differential device to other driving wheels located in forward and backward directions.

In this type of power transmission device, lubricating oil stored in a casing is suctioned up by a pump via a strainer and is supplied as lubricating oil to built-in components of the power transmission device, or is used as a working oil pressure for a hydraulic operation device (for example, refer to Japanese Patent Application Laid-Open (JP-A) No. 2014-119055).

However, in the conventional power transmission device as described in JP-A No. 2014-119055, if the pump suctions air together with the lubricating fluid such as lubricating oil from an oil reservoir (fluid reservoir), there may be a problem that a required working pressure cannot be supplied.

To prevent this, it is conceivable to perform a process in which the gas is removed from the lubricating fluid guided to the fluid reservoir using a defoaming device. However, when the defoaming device for removing the gas from the lubricating fluid is additionally provided, a size of the entire power transmission device may be increased.

SUMMARY

The present disclosure provides a flow path structure of a power transmission device which is capable of removing gas from a lubricating fluid guided to a fluid reservoir while suppressing an increase in a size of the entire power transmission device.

The present disclosure provides a flow path structure of a power transmission device (for example, a power transmission device PT in the embodiment. Hereinafter, it is the same) which removes gas from a lubricating fluid guided to a fluid reservoir inside a casing (for example, a transmission case 31 in the embodiment. Hereinafter, it is the same) of the power transmission device, including a discharge mechanism (for example, a discharge mechanism 64 in the embodiment. Hereinafter, it is the same) configured to discharge the lubricating fluid supplied to a hydraulic operating mechanism (for example, an input shaft 32, a first clutch C1, a torque converter 2, and so on in the embodiment. Hereinafter, it is the same) disposed inside the casing into an inside of the casing, wherein the casing is configured as a plurality of case members (for example, a TC side case member 61 and a TM side case member 62 in the embodiment. Hereinafter, it is the same) joined to each other via opening edges thereof, gasket (for example, a gasket 63 in the embodiment. Hereinafter, it is the same) is interposed between the case members, the gasket has an extending portion (for example, an extending portion 63a in the embodiment. Hereinafter, they are the same) configured to extend toward an inside of the casing from the opening edge, a flow path (for example, a flow path 70 in the embodiment. Hereinafter, they are the same) configured to extend from an upper portion of the casing to a lower portion thereof and to guide the lubricating fluid discharged from the discharge mechanism to the fluid reservoir is formed inside the casing in association with the extending portion and the casing, and the discharge mechanism discharges the lubricating fluid toward the flow path.

As described above, in the flow path structure of the disclosure, since the lubricating fluid from the hydraulic operating mechanism is discharged from the discharge mechanism toward the flow path, the discharged lubricating fluid flows and moves along an inner surface of the flow path. Since the gas is discharged from the lubricating fluid during such movement, the flow path can obtain a sufficient defoaming effect while having a simple constitution.

Additionally, the flow path is cooperatively formed by the extending portion of the gasket and the casing (that is, using a part of an originally disposed member). Therefore, it is possible to suppress an increase in a size of the entire device as compared with a structure in which a separate and independent defoaming device is installed.

Therefore, according to the above-described flow path structure of the disclosure, it is possible to remove gas from the lubricating fluid guided to the fluid reservoir while suppressing the increase in the size of the entire power transmission device PT.

Further, the present disclosure provides a flow path structure of a power transmission device which removes gas from a lubricating fluid guided to a fluid reservoir inside a casing of the power transmission device, including:

a discharge mechanism configured to discharge the lubricating fluid supplied to a hydraulic operating mechanism disposed inside the casing into an inside of the casing, and a built-in component disposed inside the casing and configured to form the power transmission device, wherein the casing is configured as a plurality of case members joined to each other via opening edges thereof, a gasket is interposed between the case members, the gasket has an extending portion configured to extend toward an inside of the casing from the opening edge, a flow path configured to extend from an upper portion of the casing to a lower portion thereof and to guide the lubricating fluid discharged from the discharge mechanism to the fluid reservoir is formed inside the casing in association with the extending portion and the built-in component, and the discharge mechanism discharges the lubricating fluid toward the flow path.

BRIEF DESCRIPTION OF THE DRAWINGS

FIG. 4 is an explanatory view illustrating an engagement state of each engagement mechanism in each gear shift stage of the transmission of FIG. 2.

DESCRIPTION OF THE EMBODIMENTS

Hereinafter, a vehicle in which a power transmission device having a lubricating structure according to an embodiment is mounted will be described with reference to the drawings.

Figure 1:
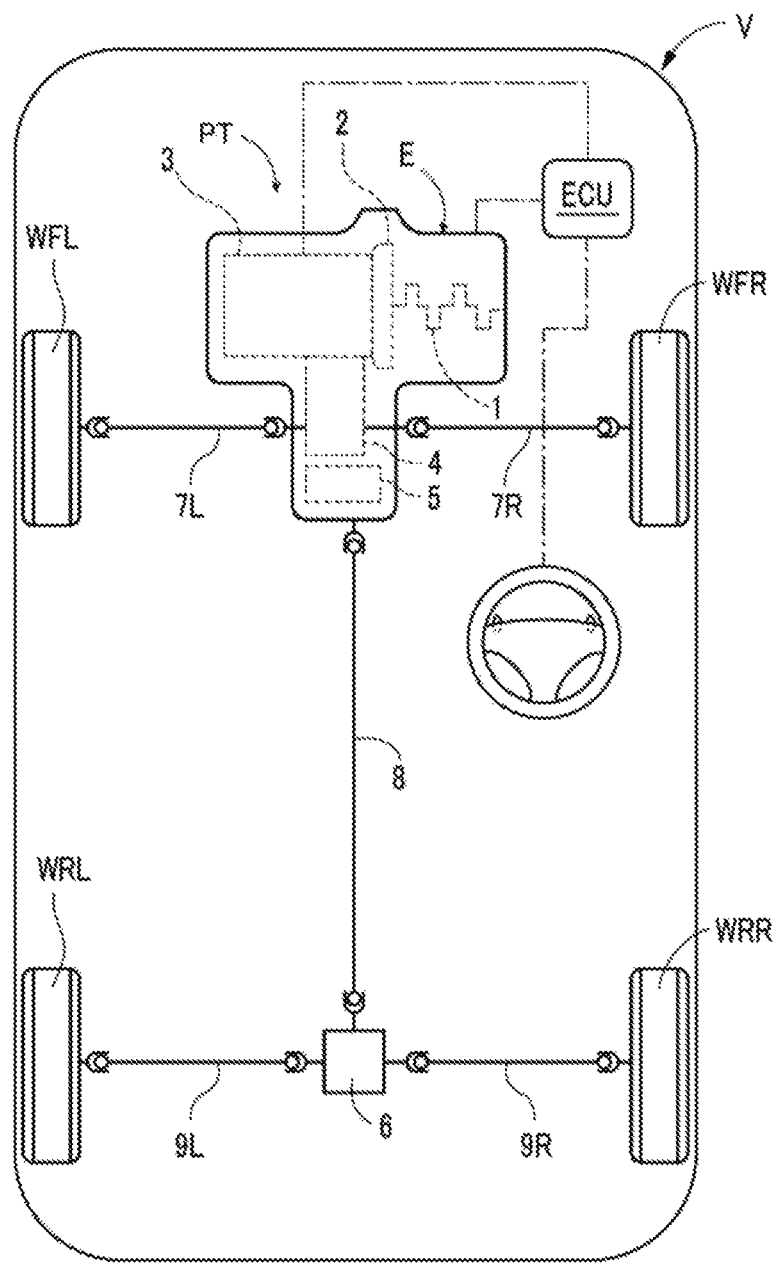
FIG. 1 is an explanatory view schematically illustrating a vehicle in which a power transmission device having a flow path structure according to an embodiment is mounted.

As illustrated in FIG. 1, an engine E (internal combustion engine or driving source) is transversely mounted in a vehicle body so that a crankshaft 1 is directed in leftward/rightward directions of the vehicle body of a vehicle V. A driving force of the engine E is transmitted to a left front wheel WFL, a right front wheel WFR, a left rear wheel WRL and a right rear wheel WRR through a power transmission device PT.

The power transmission device PT includes a torque converter 2 connected to the crankshaft 1, a transmission 3 connected to the torque converter 2, a front differential gear 4 (differential device) connected to the transmission 3, a transfer device 5 connected to the front differential gear 4, and a rear differential gear 6 connected to the transfer device 5.

The front differential gear 4 is connected to the left front wheel WFL and the right front wheel WFR via a front left axle 7L and a front right axle 7R. The rear differential gear 6 is connected to the transfer device 5 via the propeller shaft 8 and is connected to the left rear wheel WRL and the right rear wheel WRR via the rear left axle 9L and the rear right axle 9 R.

Figure 2:
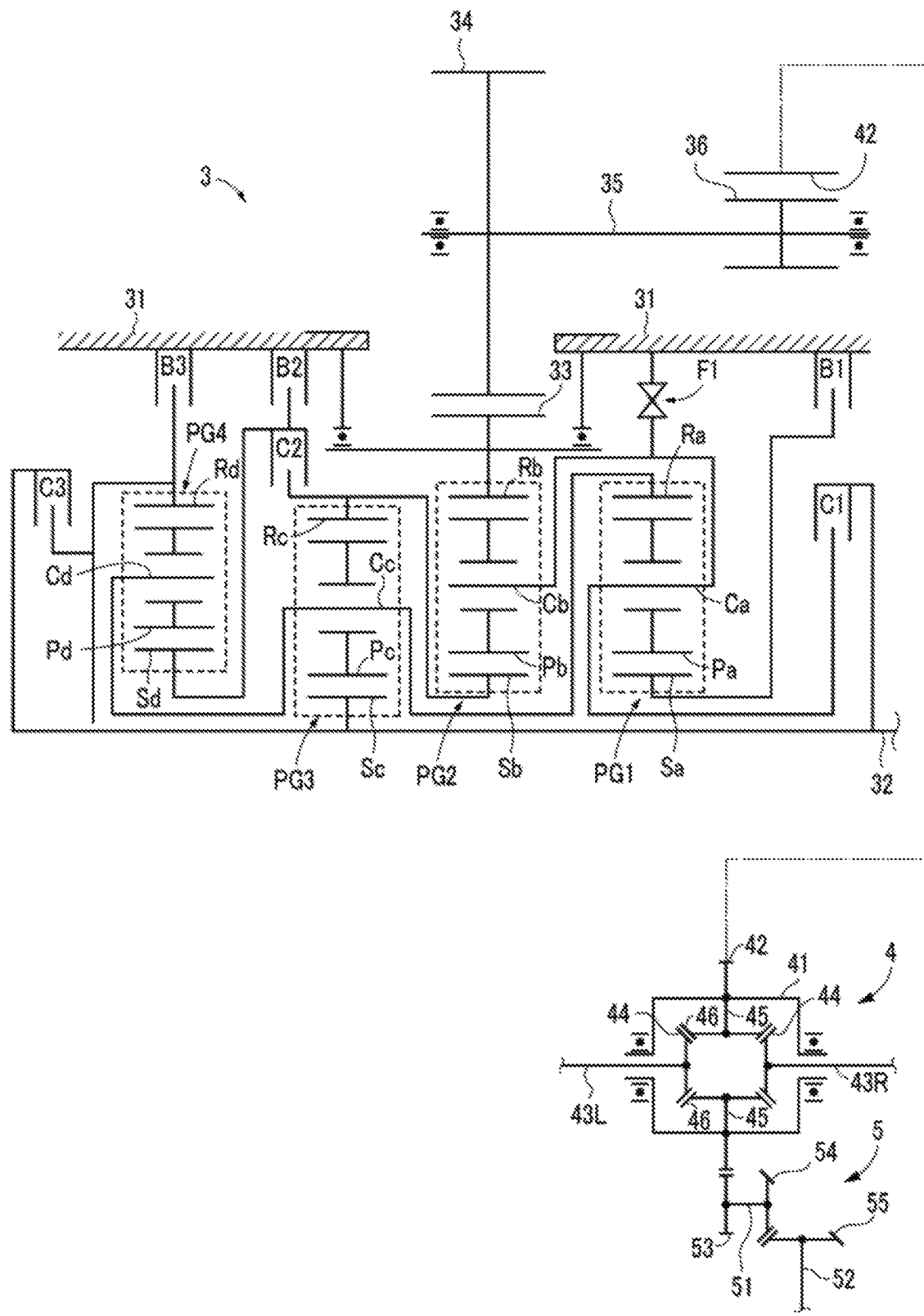
FIG. 2 is a skeleton diagram illustrating a transmission mounted in the vehicle of FIG. 1.

As illustrated in a skeleton diagram of FIG. 2, the transmission 3 includes an input shaft 32 pivotally supported inside a transmission case 31 (casing) to be rotatable, and an output member 33 configured with an output gear disposed concentrically with the input shaft 32.

The driving force output from the engine E is transmitted to the input shaft 32 via the torque converter 2 having a lock-up clutch and a damper.

Rotation of the output member 33 is transmitted to the left front wheel WFL and the right front wheel WFR (refer to FIG. 1) via an idle gear 34 engaged with the output member 33, an idle shaft 35 which pivotally supports the idle gear 34, a finale drive gear 36 pivotally supported by the idle shaft 35, and a final driven gear 42 (that is, the front differential gear 4) engaged with the final drive gear 36.

Further, in the power transmission device PT, a single plate type or multiple plate type starting clutch configured to be frictionally engageable may be provided in place of the torque converter 2.

In an inside of the transmission case 31, a first planetary gear mechanism PG1, a second planetary gear mechanism PG2, a third planetary gear mechanism PG3, and a fourth planetary gear mechanism PG4 are disposed concentrically with the input shaft 32 in order from the engine E side.

The third planetary gear mechanism PG3 is configured as a so-called single pinion type planetary gear mechanism having a sun gear Sc, a ring gear Re, and a carrier Cc pivotally supporting a pinion Pc, which is engaged with the sun gear Sc and the ring gear Rc, rotatably and revolvingly.

In a so-called single pinion type planetary gear mechanism, when the carrier is fixed and the sun gear is rotated, the ring gear rotates in a direction different from that of the sun gear, and thus the so-called single pinion type planetary gear mechanism is also referred to as a minus planetary gear mechanism or a negative planetary gear mechanism. Also, in a so-called single pinion type planetary gear mechanism, when the ring gear is fixed and the sun gear is rotated, the carrier rotates in the same direction as that of the sun gear.

Figure 3:
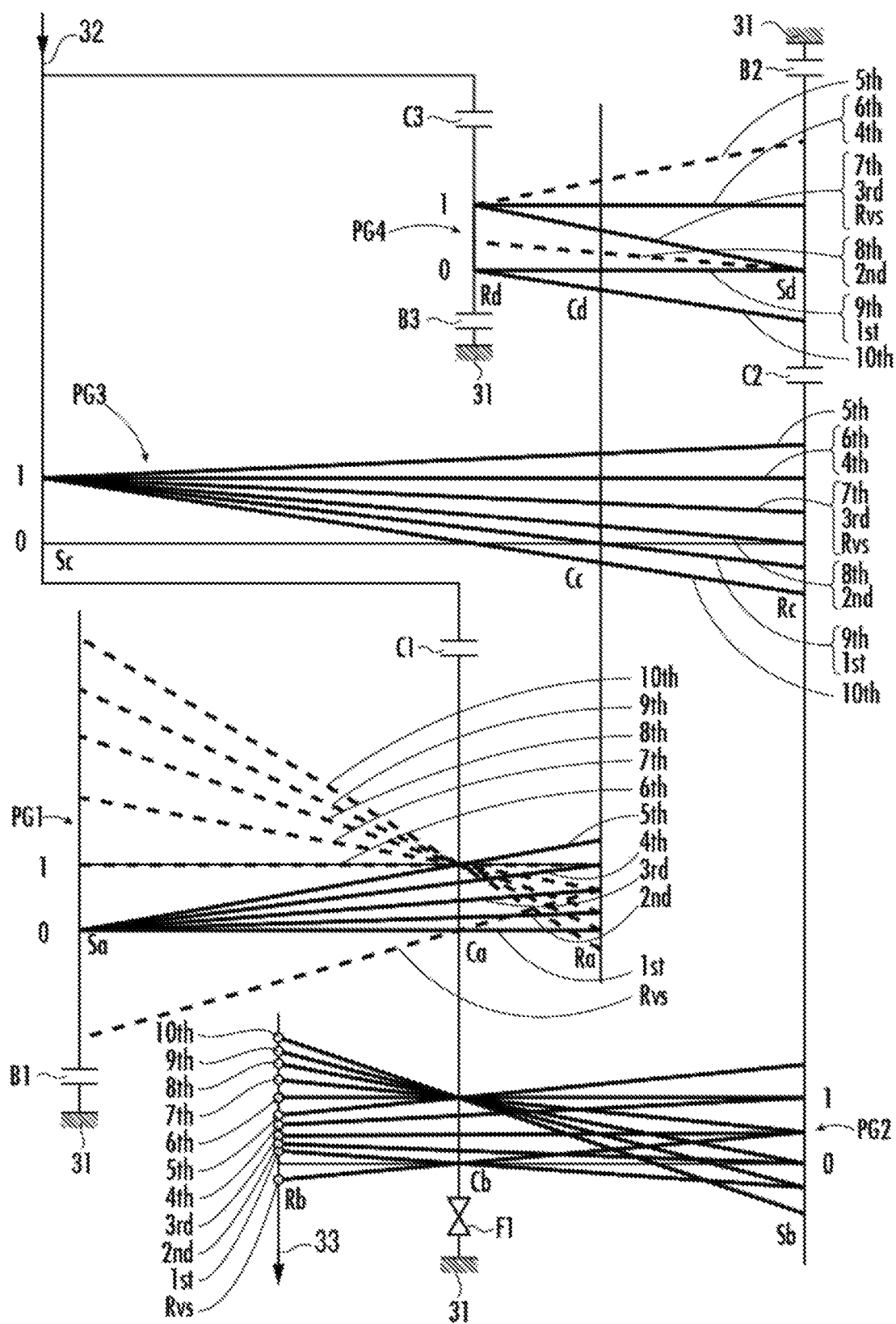
FIG. 3 is an alignment chart of a planetary gear mechanism of the transmission of FIG. 2.

An alignment chart (a diagram in which ratios between relative rotational speeds of three elements including the sun gear, the carrier and the ring gear can be expressed by a straight line (speed line)) illustrated in a second part from the top in FIG. 3 is an alignment chart of the third planetary gear mechanism PG3. As illustrated in the alignment chart, when it is assumed that the sun gear Sc, the carrier Cc and the ring gear Rc which are three elements of the third planetary gear mechanism PG3 are a first element, a second element and a third element from a left side in an arrangement order at intervals corresponding to a gear ratio (the number of teeth of the ring gear/the number of teeth of the sun gear) in the alignment chart, the first element is the sun gear Sc, the second element is the carrier Cc, and the third element is the ring gear Rc.

Here, a ratio between a distance from the sun gear Sc to the carrier Cc and a distance from the carrier Cc to the ring gear Rc is set to h:1, wherein h is the gear ratio of the third planetary gear mechanism PG3. Also, in the alignment chart, a lower horizontal line and an upper horizontal line (lines overlapping 4th and 6th) indicate that rotational speeds are "0" and "1" (the same rotational speed as that of the input shaft 11).

The fourth planetary gear mechanism PG4 is also configured as a so-called single pinion type planetary gear mechanism having a sun gear Sd, a ring gear Rd, and a carrier Cd pivotally supporting a pinion Pd, which is engaged with the sun gear Sd and the ring gear Rd, rotatably and revolvingly.

An alignment chart illustrated in a first part (uppermost part) from the top in FIG. 3 is an alignment chart of the fourth planetary gear mechanism PG4. As illustrated in the alignment chart, when it is assumed that the sun gear Sd, the carrier Cd and the ring gear Rd which are three elements of the fourth planetary gear mechanism PG4 are a fourth element, a fifth element and a sixth element from a left side in an arrangement order at intervals corresponding to a gear ratio in the alignment chart, the fourth element is the ring gear Rd, the fifth element is the carrier Cd, and the sixth element is the sun gear Sd.

Here, a ratio between a distance from the sun gear Sd to the carrier Cd and a distance from the carrier Cd to the ring gear Rd is set to i:1, wherein i is the gear ratio of the fourth planetary gear mechanism PG4.

The first planetary gear mechanism PG1 is also configured as a so-called single pinion type planetary gear mechanism having a sun gear Sa, a ring gear Ra, and a carrier Ca pivotally supporting a pinion Pa, which is engaged with the sun gear Sa and the ring gear Ra, rotatably and revolvingly.

An alignment chart illustrated in a third part from the top in FIG. 3 is an alignment chart of the first planetary gear mechanism PG1. As illustrated in the alignment chart, when it is assumed that the sun gear Sa, the carrier Ca and the ring gear Ra which are three elements of the first planetary gear mechanism PG1 are a seventh element, an eighth element and a ninth element from a left side in an arrangement order at intervals corresponding to a gear ratio in the alignment chart, the seventh element is the sun gear Sa, the eighth element is the carrier Ca, and the ninth element is the ring gear Ra.

Here, a ratio of a distance from the sun gear Sa to the carrier Ca and a distance from the carrier Ca to the ring gear Ra is set to j:1, wherein j is the gear ratio of the first planetary gear mechanism PG1.

The second planetary gear mechanism PG2 is also configured as a so-called single pinion type planetary gear mechanism having a sun gear Sb, a ring gear Rb, and a carrier Cb pivotally supporting a pinion Pb, which is engaged with the sun gear Sb and the ring gear Rb, rotatably and revolvingly.

An alignment chart illustrated in a fourth part (lowermost part) from the top in FIG. 3 is an alignment chart of the second planetary gear mechanism PG2. As illustrated in the alignment chart, when it is assumed that the sun gear Sb, the carrier Cb and the ring gear Rb which are three elements of the second planetary gear mechanism PG2 are a tenth element, an eleventh element and a twelfth element from a left side in an arrangement order at intervals corresponding to a gear ratio in the alignment chart, the tenth element is the ring gear Rb, the eleventh element is the carrier Cb, and the twelfth element is the sun gear Sb.

Here, a ratio of a distance from the sun gear Sb to the carrier Cb and a distance from the carrier Cb to the ring gear Rb is set to k:1, wherein k is the gear ratio of the second planetary gear mechanism PG2.

The sun gear Sc (first element) of the third planetary gear mechanism PG3 is connected to the input shaft 32. Further, the ring gear Rb (tenth element) of the second planetary gear mechanism PG2 is connected to the output member 33 configured as the output gear.

Also, the carrier Cc (second element) of the third planetary gear mechanism PG3, the carrier Cd (fifth element) of the fourth planetary gear mechanism PG4 and the ring gear Ra (ninth element) of the first planetary gear mechanism PG1 are connected to each other, and a first connected body Cc-Cd-Ra is formed.

Also, the ring gear Rc (third element) of the third planetary gear mechanism PG3 and the sun gear Sb (twelfth element) of the second planetary gear mechanism PG2 are connected to each other, and a second connected body Rc-Sb is formed.

Also, the carrier Ca (eighth element) of the first planetary gear mechanism PG1 and the carrier Cb (eleventh element) of the second planetary gear mechanism PG2 are connected to each other, and a third connected body Ca-Cb is formed.

Further, the transmission 3 has seven engagement mechanisms which includes three clutches which are a first clutch C1, a second clutch C2 and a third clutch C3, and three brakes which are a first brake B1, a second brake B2 and a third brake B3, and one two-way clutch F1.

The first clutch C1 is a hydraulically actuated wet multiple disk clutch. Due to the first clutch C1, the third planetary gear mechanism PG3 is configured to be switchable between a connected state in which the sun gear Sc (first element) and the third connected body Ca-Cb are connected and an open state in which the connection is disconnected.

The third clutch C3 is a hydraulically actuated wet multiple disk clutch. Due to the third clutch C3, the third planetary gear mechanism PG3 is configured to be switchable between a connected state in which the sun gear Sc (first element) and the ring gear Rd (fourth element) of the fourth planetary gear mechanism PG4 are connected and an open state in which the connection is disconnected.

The second clutch C2 is a hydraulically actuated wet multiple disk clutch. Due to the second clutch C2, the fourth planetary gear mechanism PG4 is configured to be switchable between a connected state in which the sun gear Sd (sixth element) and the second connected body Rc-Sb are connected and an open state in which the connection is disconnected.

The two-way clutch F1 also serves as a fourth brake B4. The two-way clutch F1 is configured to be switchable between a reverse rotation prevention state in which normal rotation (rotation in the same direction as a rotation direction of the input shaft 32 and the output member 33) of the third connected body Ca-Cb is allowed and reverse rotation is prevented and a fixed state in which the third connected body Ca-Cb is fixed to the transmission case 31.

In the reverse rotation prevention state, when a force intended to cause rotation in a normal rotation direction is applied to the third connected body Ca-Cb, rotation is allowed, and the two-way clutch F1 is brought into the open state. On the other hand, when a force intended to cause rotation in a reverse rotation direction is applied, rotation is blocked, and the two-way clutch F1 is brought into the fixed state in which the third connected body Ca-Cb is fixed to the transmission case 31.

The first brake B1 is a hydraulically actuated wet multiple disk brake. Due to the first brake B1, the first planetary gear mechanism PG1 is configured to be switchable between a fixed state in which the sun gear Sa (seventh element) is fixed to the transmission case 31 and an open state in which the fixed state is released.

The second brake B2 is a hydraulically actuated wet multiple disk brake. Due to the second brake B2, the fourth planetary gear mechanism PG4 is configured to be switchable between a fixed state in which the sun gear Sd (sixth element) is fixed to the transmission case 31 and an open state in which the fixed state is released.

The third brake B3 is a hydraulically actuated wet multiple disk brake. Due to the third brake B3, the fourth planetary gear mechanism PG4 is configured to be switchable between a fixed state in which the ring gear Rd (fourth element) is fixed to the transmission case 31 and an open state in which the fixed state is released.

The switching of the three clutches of the first clutch C1, the second clutch C2 and the third clutch C3, the three brakes of the first brake B1, the second brake B2 and the third brake B3, and one two-way clutch F1 is controlled by an electronic control unit (ECU) (refer to FIG. 1) including a transmission control unit (TCU) on the basis of vehicle information such as a traveling speed of a vehicle V transmitted from an integrated control unit which is not illustrated.

The electronic control unit (ECU) includes an electronic unit composed of a CPU, a memory or the like which is not illustrated. The electronic control unit (ECU) receives predetermined vehicle information such as a traveling speed of the vehicle V or an opening degree of an accelerator, a rotational speed or an output torque of the engine E, operation infonnation of a paddle shift lever, and so on and controls the transmission 3 by executing a control program held in a storage device such as a memory by a CPU.

In the transmission 3, the first clutch C1, the first planetary gear mechanism PG1, the second planetary gear mechanism PG2, the third planetary gear mechanism PG3, the second clutch C2, the fourth planetary gear mechanism PG4 and the third clutch C3 are disposed on an axial line of the input shaft 32 in this order from the engine E and torque converter 2 side.

Additionally, the third brake B3 is disposed radially outward of the fourth planetary gear mechanism PG4, the second brake B2 is disposed radially outward of the second clutch C2, the first brake B1 is disposed radially outward of the first clutch C1, and the two-way clutch F1 is disposed radially outward of the first planetary gear mechanism PG1.

Accordingly, in the transmission 3, the first brake B 1, the second brake B2, the third brake B3 and the two-way clutch F1 are disposed radially outside of the planetary gear mechanism or the clutch. Therefore, an axial length of the transmission 3 is shortened as compared with the case in which the first brake B1, the second brake B2, the third brake B3 and the two-way clutch F1 are disposed parallel to each other together with the planetary gear mechanism on the axial line of the input shaft 32.

Further, even if the third brake B3 is disposed radially outward of the third clutch C3 and the second brake B2 is disposed radially outward of the fourth planetary gear mechanism PG4, it is also possible to shorten the axial length.

Next, a case in which each gear shift stage of the transmission 3 of the embodiment is established will be described with reference to FIG. 3 and FIG. 4.

Further, a speed line indicated by a broken line in FIG. 3 indicates that elements of other planetary gear mechanisms rotate (idle) by following a planetary gear mechanism which transmits power among the first planetary gear mechanism PG1, the second planetary gear mechanism PG2, the third planetary gear mechanism PG3 and the fourth planetary gear mechanism PG4.

FIG. 4 is a diagram collectively illustrating states of the three clutches of the first clutch C1, the second clutch C2 and the third clutch C3, the three brakes of the first brake B1, the second brake B2 and the third brake B3, and one two-way clutch F1 in each gear shift stage which will be described later.

In this drawing, "O" in a row of each of the first clutch C1, the second clutch C2, the third clutch C3, the first brake B1, the second brake B2 and the third brake B3 indicates a connected state or a fixed state, and a blank indicates an open state. Also, "R" in a row of the two-way clutch F1 indicates a reverse rotation prevention state, and "L" indicates a fixed state.

Further, underlined "R" and "L" indicate that the rotational speed of the third connected body Ca-Cb becomes "0" due to an action of the two-way clutch F1. Also, "R/L" indicates a state that is a reverse rotation prevention state "R" normally but switched to a fixed state "L" when an engine brake is applied.

Further, FIG. 4 indicates a gear shift ratio (rotational speed of the input shaft 32/rotational speed of the output member 33) in each gear shift stage and a common ratio (a ratio of gear ratios between gear shift stages; a value obtained by dividing a gear shift ratio of a predetermined gear shift stage by a gear shift ratio of a gear shift stage that is one gear shift stage higher than the predetermined gear shift stage) in which the gear ratio h of the third planetary gear mechanism PG3 is 2.734, the gear ratio i of the fourth planetary gear mechanism PG4 is 1.614, the gear ratio j of the first planetary gear mechanism PG1 is 2.681, and the gear ratio k of the second planetary gear mechanism PG2 is 1.914. Accordingly, it can be understood that common ratio can be appropriately set.

When a first gear stage is established, the two-way clutch F1 is brought into the reverse rotation prevention state (R in FIG. 4), and the first brake B1 and the second brake B2 are brought into the fixed state.

By setting the two-way clutch F1 to be in the reverse rotation prevention state R and setting the first brake B1 to be in the fixed state, the reverse rotation of the third connected body Ca-Cb and the sun gear Sa (seventh element) of the first planetary gear mechanism PG1 is prevented, and the rotational speed of the third connected body Ca-Cb and the sun gear Sa (seventh element) of the first planetary gear mechanism PG1 becomes "0".

Accordingly, the sun gear Sa (seventh element), the carrier Ca (eighth element), and the ring gear Ra (ninth element) of the first planetary gear mechanism PG1 are brought into a locked state in which relative rotation is not possible, and the rotational speed of the first connected body Cc-Cd-Ra including the ring gear Ra (ninth element) of the first planetary gear mechanism PG1 also becomes "0".

Then, the rotational speed of the ring gear Rb (tenth element) of the second planetary gear mechanism PG2 to which the output member 33 is connected becomes "1st" illustrated in FIG. 3, and the first gear stage is established.

Also, in order to establish the first gear stage, it is not necessary to set the second brake B2 in the fixed state. However, to smoothly shift from the first gear stage to a second gear stage which will be described later, the second brake B2 is fixed in the first gear stage. Further, when the engine brake is applied at the first gear stage, the two-way clutch F1 may be switched from the reverse rotation prevention state R to the fixed state L.

When the second gear stage is established, the two-way clutch F1 is set to be in the reverse rotation prevention state R, the first brake B1 and the second brake B2 are set to be in the fixed state, and the second clutch C2 is set to be in the connected state.

By setting the two-way clutch F1 to be in the reverse rotation prevention state, normal rotation of the third connected body Ca-Cb is allowed. Further, by setting the first brake B1 to be in the fixed state, the rotational speed of the sun gear Sa (seventh element) of the first planetary gear mechanism PG1 becomes "0". Furthermore, by setting the second brake B2 to be in the fixed state, the rotational speed of the sun gear Sd (sixth element) of the fourth planetary gear mechanism PG4 becomes "0".

Also, by setting the second clutch C2 to be in the connected state, the rotational speed of the second connected body Rc-Sb becomes "0" which is the same speed as the rotational speed of the sun gear Sd (sixth element) of the fourth planetary gear mechanism PG4.

Then, the rotational speed of the ring gear Rb (tenth element) of the second planetary gear mechanism PG2 to which the output member 33 is connected becomes "2nd" illustrated in FIG. 3, and the second gear stage is established.

When a third gear stage is established, the two-way clutch F1 is set to be in the reverse rotation prevention state, the first brake B1 and the second brake B2 are set to be in the fixed state, and the third clutch C3 is set to be in the connected state.

By setting the two-way clutch F1 to be in the reverse rotation prevention state, normal rotation of the third connected body Ca-Cb is allowed. Further, by setting the first brake B1 to be in the fixed state, the rotational speed of the sun gear Sa (seventh element) of the first planetary gear mechanism PG1 becomes "0". Furthermore, by setting the second brake B2 to be in the fixed state, the rotational speed of the sun gear Sd (sixth element) of the fourth planetary gear mechanism PG4 becomes "0".

Also, by setting the third clutch C3 to be in the connected state, the rotational speed of the ring gear Rd (fourth element) of the fourth planetary gear mechanism PG4 becomes "1" which is the same speed as the rotational speed of the sun gear Sc (first element) of the third planetary gear mechanism PG3 connected to the input shaft 32.

Accordingly, since the rotational speed of the sun gear Sd (sixth element) of the fourth planetary gear mechanism PG4 becomes "0" and the rotational speed of the ring gear Rd (fourth element) becomes "1", the rotational speed of the carrier Cd (fifth element), that is, the rotational speed of the first connected body Cc-Cd-Ra becomes i/(i+1).

Additionally, the rotational speed of the ring gear Rb (tenth element) of the second planetary gear mechanism PG2 to which the output member 33 is connected becomes "3rd" illustrated in FIG. 3, and the third gear stage is established.

When a fourth gear stage is established, the two-way clutch F1 is set to be in the reverse rotation prevention state, the first brake B1 is set to be in the fixed state, and the second clutch C2 and the third clutch C3 are set to be in the connected state.

By setting the two-way clutch F1 to be in the reverse rotation prevention state, normal rotation of the third connected body Ca-Cb is allowed. Further, by setting the first brake B1 to be in the fixed state, the rotational speed of the sun gear Sa (seventh element) of the first planetary gear mechanism PG1 becomes "0".

Further, by setting the second clutch C2 to be in the connected state, the sun gear Sd (sixth element) of the fourth planetary gear mechanism PG4 and the second connected body Rc-Sb rotate at the same speed. Therefore, between the third planetary gear mechanism PG3 and the fourth planetary gear mechanism PG4, the carrier Cc (second element) and the carrier Cd (fifth element) are connected, and the ring gear Rc (third element) and the sun gear Sd (sixth element) are connected. Therefore, in the fourth gear stage in which the second clutch C2 is in the connected state, one alignment chart including four elements formed by the third planetary gear mechanism PG3 and the fourth planetary gear mechanism PG4 can be drawn.

Also, by setting the third clutch C3 to be in the connected state, the rotational speed of the ring gear Rd (fourth element) of the fourth planetary gear mechanism PG4 becomes "1" which is the same speed as the rotational speed of the sun gear Sc (first element) of the third planetary gear mechanism PG3, and the rotational speeds of two elements among the four elements formed by the third planetary gear mechanism PG3 and the fourth planetary gear mechanism PG4 become the same speed of "1".

Accordingly, each of the elements of the third planetary gear mechanism PG3 and the fourth planetary gear mechanism PG4 is in the locked state in which relative rotation is not possible, and the rotational speeds of all the elements of the third planetary gear mechanism PG3 and the fourth planetary gear mechanism PG4 become j/(j+1).

Additionally, the rotational speed of the ring gear Rb (tenth element) of the second planetary gear mechanism PG2 to which the output member 33 is connected becomes "4th" illustrated in FIG. 3, and the fourth gear stage is established.

When a fifth gear stage is established, the two-way clutch F1 is set to be in the reverse rotation prevention state, the first brake B1 is set to be in the fixed state, and the first clutch C1 and the third clutch C3 are set to be in the connected state.

By setting the two-way clutch F1 to be in the reverse rotation prevention state, normal rotation of the third connected body Ca-Cb is allowed. Further, by setting the first brake B1 to be in the fixed state, the rotational speed of the sun gear Sa (seventh element) of the first planetary gear mechanism PG1 becomes "0".

Further, by setting the first clutch C1 to be in the connected state, the rotational speed of the third connected body Ca-Cb becomes "1" which is the same speed as the rotational speed of the sun gear Sc (first element) of the third planetary gear mechanism PG3.

Additionally, the rotational speed of the ring gear Rb (tenth element) of the second planetary gear mechanism PG2 to which the output member 33 is connected becomes "5th" illustrated in FIG. 3, and the fifth gear stage is established.

Also, to establish the fifth gear stage, it is not necessary to set the third clutch C3 to be in the connected state. However, in the fourth gear stage and a sixth gear stage which will be described later, it is necessary to set the third clutch C3 in the connected state, and thus the fifth gear stage is also set to be in the connected state such that downshifting from the fifth gear stage to the fourth gear stage and upshifting from the fifth gear stage to the sixth gear stage which will be described later can be performed smoothly.

When the sixth gear stage is established, the two-way clutch F1 is set to be in the reverse rotation prevention state, and the first clutch C1, the second clutch C2 and the third clutch C3 are set to be in the connected state.

By setting the two-way clutch F1 to be in the reverse rotation prevention state, the normal rotation of the third connected body Ca-Cb is allowed.

Further, by setting the second clutch C2 and the third clutch C3 to be in the connected state, each of the elements of the third planetary gear mechanism PG3 and the fourth planetary gear mechanism PG4 is in a locked state in which the relative rotation is not possible, and the rotational speed of the second connected body Rc-Sb becomes "1" as described for the fourth gear stage. Furthermore, by setting the first clutch C1 to be in the connected state, the rotational speed of the third connected body Ca-Cb becomes "1".

As a result, the rotational speeds of the carrier Cb (eleventh element) and the sun gear Sb (twelfth element) of the second planetary gear mechanism PG2 become the same speed of "1", and each of the elements is in the locked state in which relative rotation is not possible.

Additionally, the rotational speed of the ring gear Rb (tenth element) of the second planetary gear mechanism PG2 to which the output member 33 is connected becomes "6th" illustrated in FIG. 3, and the sixth gear stage is established.

When a seventh gear stage is established, the two-way clutch F1 is set to be in the reverse rotation prevention state, the second brake B2 is set to be in the fixed state, and the first clutch C1 and the third clutch C3 are set to be in the connected state.

By setting the two-way clutch F1 to be in the reverse rotation prevention state, normal rotation of the third connected body Ca-Cb is allowed. Further, by setting the second brake B2 to be in the fixed state, the rotational speed of the sun gear Sd (sixth element) of the fourth planetary gear mechanism PG4 becomes "0".

Also, by setting the third clutch C3 to be in the connected state, the rotational speed of the ring gear Rd (fourth element) of the fourth planetary gear mechanism PG4 becomes "1" which is the same speed as the rotational speed of the sun gear Sc (first element) of the third planetary gear mechanism PG3, and the rotational speed of the first connected body Ccl-Cd-Ra including the carrier Cd (fifth element) of the fourth planetary gear mechanism PG4 becomes i/(i+1). Further, by setting the first clutch C1 to be in the connected state, the rotational speed of the third connected body Ca-Cb becomes "1" which is the same speed as the rotational speed of the sun gear Sc (first element) of the third planetary gear mechanism PG3 connected to the input shaft 32.

Additionally, the rotational speed of the ring gear Rb (tenth element) of the second planetary gear mechanism PG2 to which the output member 33 is connected becomes "7th" illustrated in FIG. 3, and the seventh gear stage is established.

When an eighth gear stage is established, the two-way clutch F1 is set to be in the reverse rotation prevention state, the second brake B2 is set to be in the fixed state, and the first clutch C1 and the second clutch C2 are set to be in the connected state.

By setting the two-way clutch F1 to be in the reverse rotation prevention state, normal rotation of the third connected body Ca-Cb is allowed. Further, by setting the second brake B2 to be in the fixed state, the rotational speed of the sun gear Sd (sixth element) of the fourth planetary gear mechanism PG4 becomes "0".

Further, by setting the second clutch C2 to be in the connected state, the rotational speed of the second connected body Rc-Sb becomes "0" which is the same speed as the rotational speed of the sun gear Sd (sixth element) of the fourth planetary gear mechanism PG4. Also, by setting the first clutch C1 to be in the connected state, the rotational speed of the third connected body Ca-Cb becomes "1" which is the same speed as the rotational speed of the sun gear Sc (first element) of the third planetary gear mechanism PG3.

Additionally, the rotational speed of the ring gear Rb (tenth element) of the second planetary gear mechanism PG2 to which the output member 33 is connected becomes "8th" illustrated in FIG. 3, and the eighth gear stage is established.

When a ninth gear stage is established, the two-way clutch F1 is set to be in the reverse rotation prevention state, the second brake B2 and the third brake B3 are set to be in the fixed state, and the first clutch C1 is set to be in the connected state.

By setting the two-way clutch F1 to be in the reverse rotation prevention state, normal rotation of the third connected body Ca-Cb is allowed. Further, by setting the second brake B2 to be in the fixed state, the rotational speed of the sun gear Sd (sixth element) of the fourth planetary gear mechanism PG4 becomes "0". Also, by setting the third brake B3 to be in the fixed state, the rotational speed of the ring gear Rd (fourth element) of the fourth planetary gear mechanism PG4 also becomes "0".

Accordingly, the sun gear Sd (sixth element), the carrier Cd (fifth element), and the ring gear Rd (fourth element) of the fourth planetary gear mechanism PG4 are in the locked state in which relative rotation is not possible, and the rotational speed of the first connected body Cc-Cd-Ra including the carrier Cd (fifth element) of the fourth planetary gear mechanism PG4 also becomes "0".

Further, by setting the first clutch C1 to be in the connected state, the rotational speed of the third connected body Ca-Cb becomes "1" which is the same speed as the rotational speed of the sun gear Sc (first element) of the third planetary gear mechanism PG3.

Additionally, the rotational speed of the ring gear Rb (tenth element) of the second planetary gear mechanism PG2 to which the output member 33 is connected becomes "9th" illustrated in FIG. 3, and the ninth gear stage is established.

When a tenth gear stage is established, the two-way clutch F1 is set to be in the reverse rotation prevention state R, the third brake B3 is set to be in the fixed state, and the first clutch C1 and the second clutch C2 are set to be in the connected state.

By setting the two-way clutch F1 to be in the reverse rotation prevention state, normal rotation of the third connected body Ca-Cb is allowed. Also, by setting the third brake B3 to be in the fixed state, the rotational speed of the ring gear Rd (fourth element) of the fourth planetary gear mechanism PG4 becomes "0".

Further, by setting the second clutch C2 to be in the connected state, the second connected body Rc-Sb and the sun gear Sd (sixth element) of the fourth planetary gear mechanism PG4 rotate at the same speed. Also, by setting the first clutch C1 to be in the connected state, the rotational speed of the third connected body Ca-Cb becomes "1" which is the same speed as the rotational speed of the sun gear Sc (first element) of the third planetary gear mechanism PG3.

Additionally, the rotational speed of the ring gear Rb (tenth element) of the second planetary gear mechanism PG2 to which the output member 33 is connected becomes "10th" illustrated in FIG. 3, and the tenth gear stage is established.

When a reverse gear stage is established, the two-way clutch F1 is set to be in the fixed state (L in FIG. 4), the second brake B2 is set to be in the fixed state, and the third clutch C3 is set to be in the connected state.

By setting the second brake B2 to be in the fixed state and setting the third clutch C3 to be connected state, the rotational speed of the first connected body Cc-Cd-Ra becomes i/(i+1). Further, by setting the two-way clutch F1 to be in the fixed state, the rotational speed of the third connected body Ca-Cb becomes "0".

Additionally, the rotational speed of the ring gear Rb (tenth element) of the second planetary gear mechanism PG2 to which the output member 33 is connected becomes "Rvs" of the reverse rotation illustrated in FIG. 3, and the reverse gear stage is established.

Figure 5:
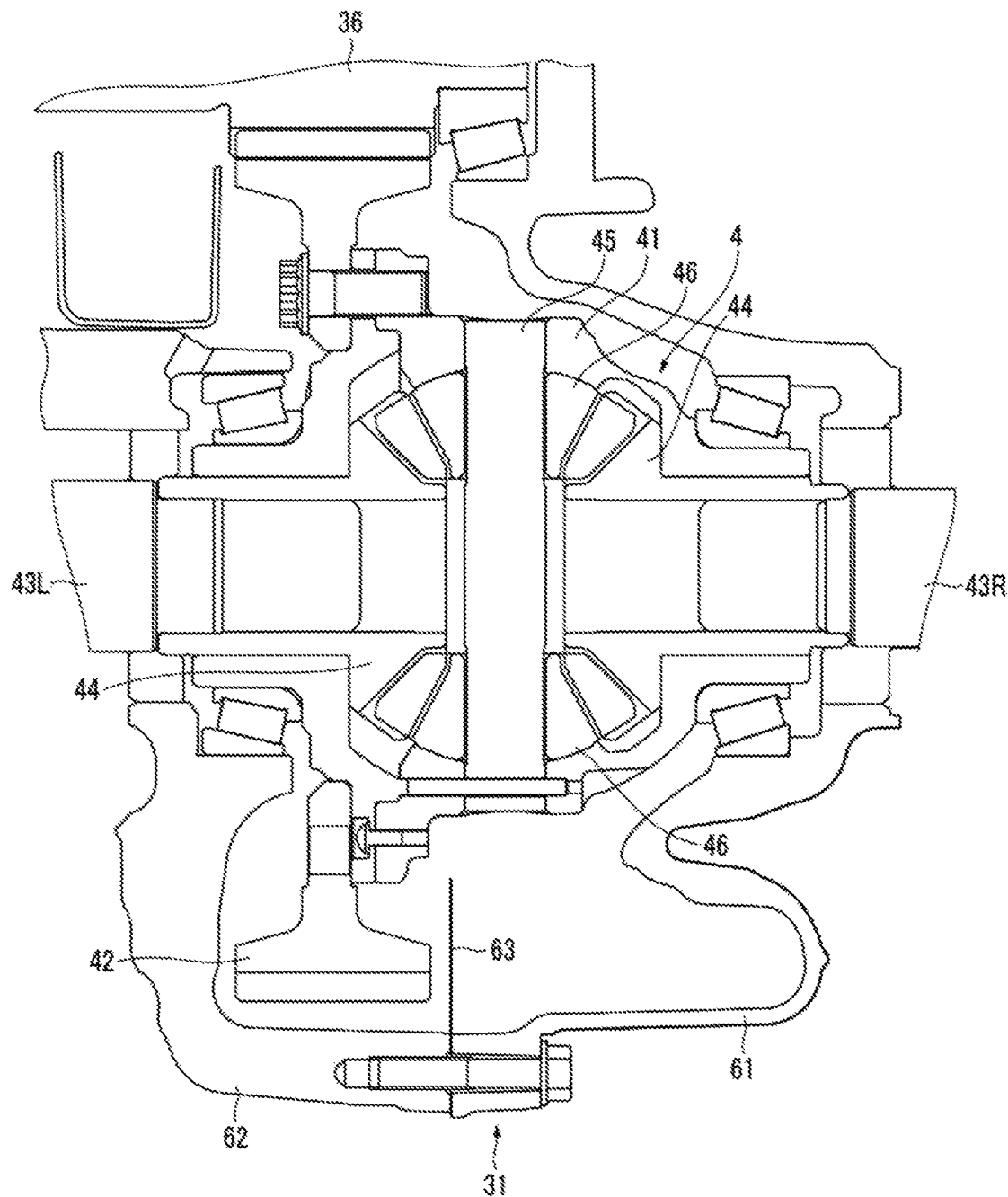
FIG. 5 is a front view illustrating a main portion of a transmission case of the power transmission device of FIG. 1 in section.

Returning to FIG. 2, the front differential gear 4 includes a differential case 41 rotatably supported by the transmission case 31 of the transmission 3 (refer to FIG. 5). The final driven gear 42 which is engaged with the final drive gear 36 provided on the idle shaft 35 is fixed to an outer circumference of the differential case 41.

The rotation of the idle shaft 35 of the transmission 3 is transmitted to the differential case 41 via the final drive gear 36 and the final driven gear 42. The rotation of the differential case 41 is transmitted to the front left axle 7L and the front right axle 7R according to loads on the left front wheel WFL and the right rear wheel WRR.

A front left output shaft 43L connected to the front left axle 7L and a front right output shaft 43R connected to the front right axle 7R are engaged with the differential case 41 to be relatively rotatable. A differential side gear 44 is spline-coupled to each of facing ends of the front left output shaft 43L and the front right output shaft 43R.

A pinion shaft 45 is fixed inside the differential case 41 to be orthogonal to the front left output shaft 43L and the front right output shaft 43R. A pair of pinion gears 46 engaged with the two differential side gears 44 are rotatably supported by the pinion shaft 45.

The transfer device 5 includes a transfer input shaft 51 to which a driving force is transmitted from the final driven gear 42 of the front differential gear 4, and a transfer output shaft 52 to which the driving force is transmitted from the transfer input shaft 51 and which transmits the driving force to a propeller shaft 8.

A transfer input gear 53 engaged with the final driven gear 42 is spline coupled to and pivotally supported by an end of the transfer input shaft 51 on the front differential gear 4 side. A first bevel gear 54 which is a helical gear is provided at an opposite end of the transfer input shaft 51.

A second bevel gear 55 which is a helical gear is provided at an end (front end) of the transfer output shaft 52 on the transfer input shaft 51 side. On the other hand, an end of the propeller shaft 8 is coupled to a rear end of the transfer output shaft 52.

As the first bevel gear 54 and the second bevel gear 55 are engaged with each other, rotation of the transfer input shaft 51 is transmitted to the propeller shaft 8 (refer to FIG. 1) via the transfer output shaft 52.

Next, a flow path structure of the transmission case 31 (casing) and the power transmission device PT provided therein will be described with reference to FIGS. 5 to 8. The flow path structure serves to remove gas from the lubricating oil (lubricating fluid) which is discharged into the inside of the transmission case 31 from a hydraulic operating mechanism (for example, the torque converter 2, the input shaft 32, the first clutch C1, or the like) that is a fluid pressure operating mechanism and forms an oil reservoir (fluid reservoir) therein.

First, a configuration of the flow path will be described with reference to FIGS. 5 to 8.

As illustrated in FIG. 5, the transmission case 31 is formed by joining a TC side case member 61 (torque converter side case member) and a TM side case member 62 (transmission side case member) to each other at opening edges thereof. Further, a gasket 63 is interposed between an opening end edge of the TC side case member 61 and an opening end edge of the TM side case member 62 to prevent the lubricating oil therein from leaking.

Figure 6:
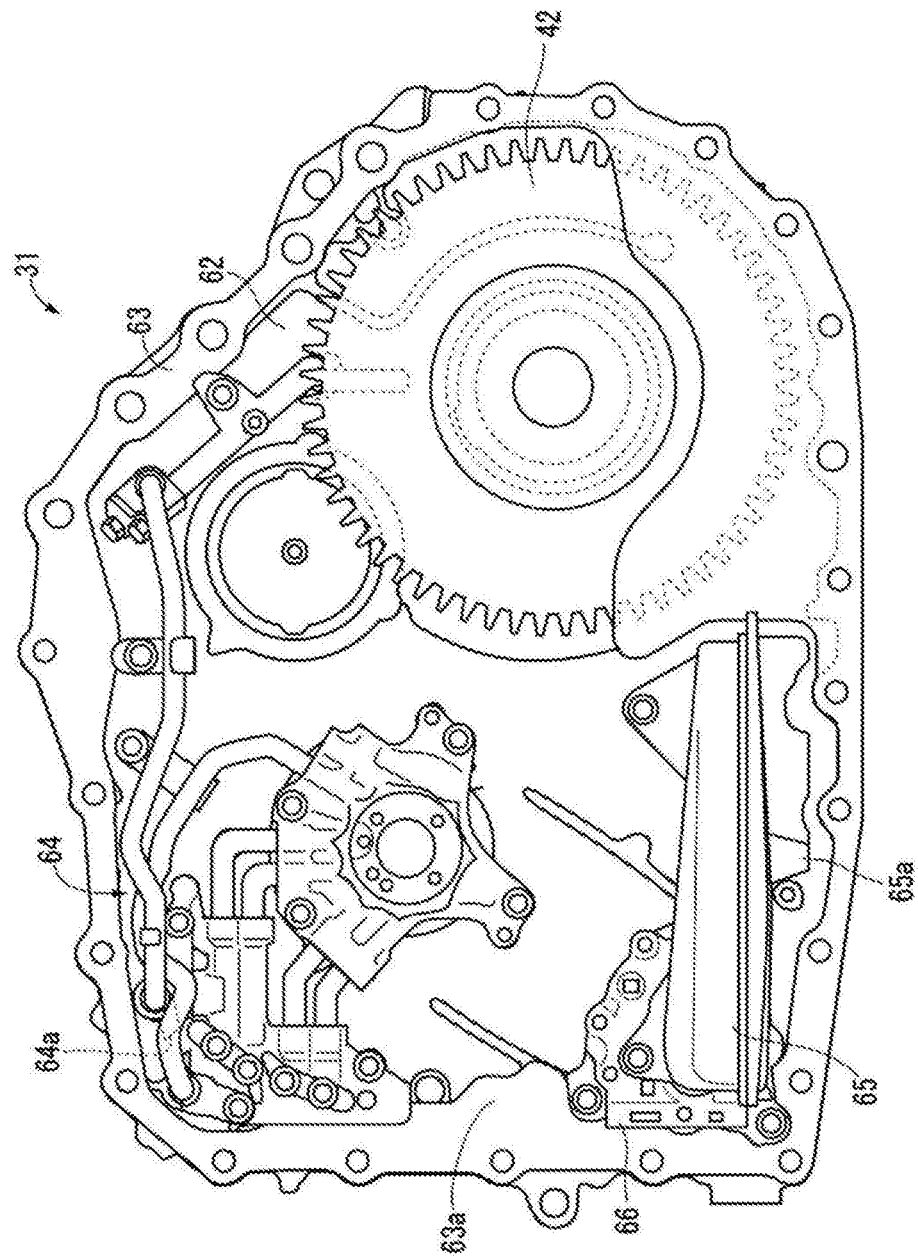
FIG. 6 is a side view illustrating a TM side case member of the transmission case of FIG. 5, and built-in components and gaskets fixed thereto.

As illustrated in FIG. 6, the gasket 63 has an extending portion 63*a*, which extends inward from an opening end edge of the transmission case 31, at a position between a discharge mechanism 64 and a pump 66 which will be described later.

Built-in components (for example, the discharge mechanism 64, a strainer 65, the pump 66, and so on) forming the power transmission device PT are disposed inside the TM side case member 62 (that is, the transmission case 31).

The discharge mechanism 64 is disposed at a position which is located on a side above an internal space of the TM side case member 62 and corresponds to the hydraulic operating mechanism such as the torque converter 2. The discharge mechanism 64 is a mechanism which discharges at least some of hydraulic oil used in the hydraulic operating mechanism as the lubricating oil from a discharge port 64*a* thereof to the inside of the transmission case 31.

Further, the strainer 65 and the pump 66 are disposed at a position which on a side below the internal space of the TM side case member 62, is located on the TC side case member 61 side of the gasket 63 (that is, an end surface of the TM side case member 62) and is away from the final driven gear 42 in a direction intersected to a rotational central axis of the final driven gear 42 (that is, a position on a front side in a traveling direction of the vehicle V).

The strainer 65 has a suction port 65*a* for suctioning the lubricating oil from the oil reservoir at a center of a lower surface thereof. The strainer 65 suctions the lubricating oil from the oil reservoir formed by storing the lubricating oil inside the transmission case 31 from the suction port 65*a* and supplies the lubricating oil to the hydraulic operating mechanism via the pump 66.

Figure 7:
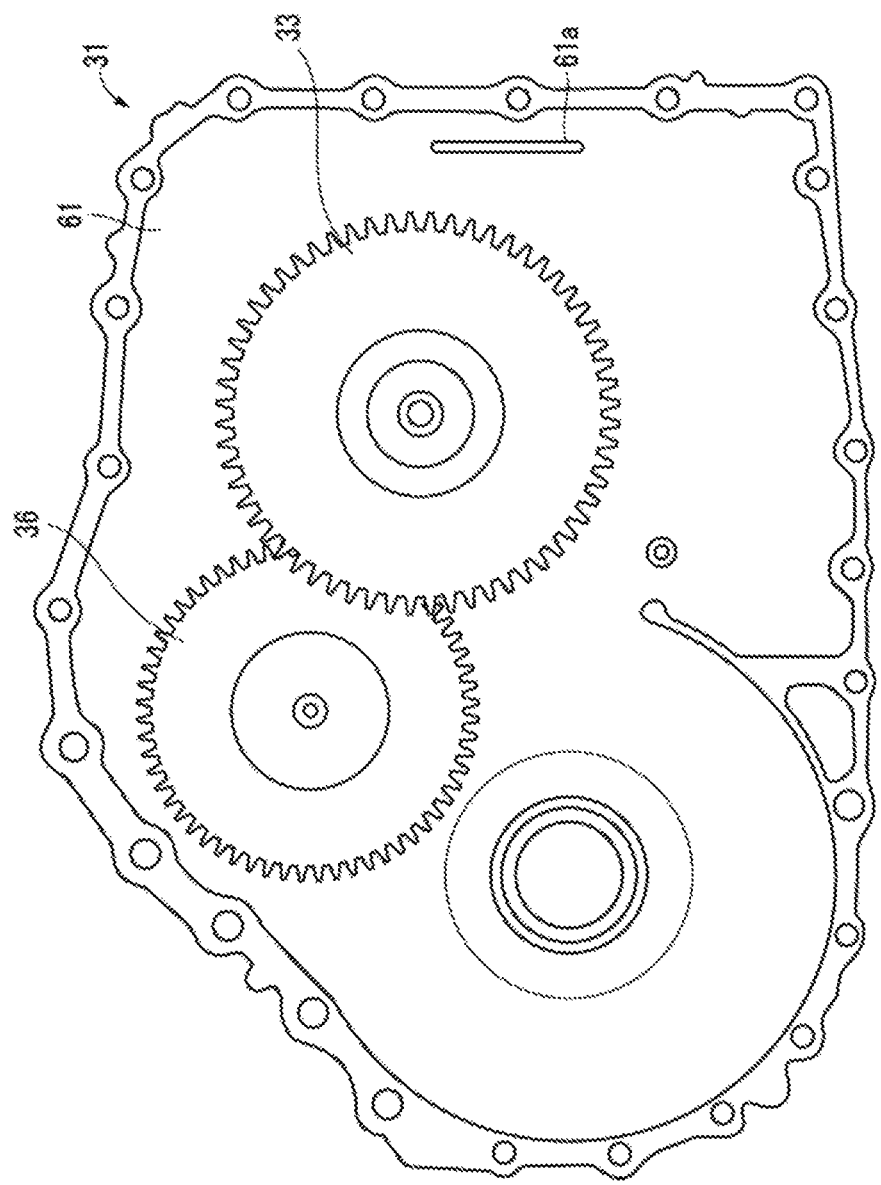
FIG. 7 is a side view illustrating a TC side case member of the transmission case of FIG. 5 and built-in components fixed thereto.

As illustrated in FIG. 7, the TC side case member 61 has a rib 61*a,* which protrudes toward the TM side case member 62 side and extends in a vertical direction, at a position corresponding to the extending portion 63*a* of the gasket 63.

Figure 8:
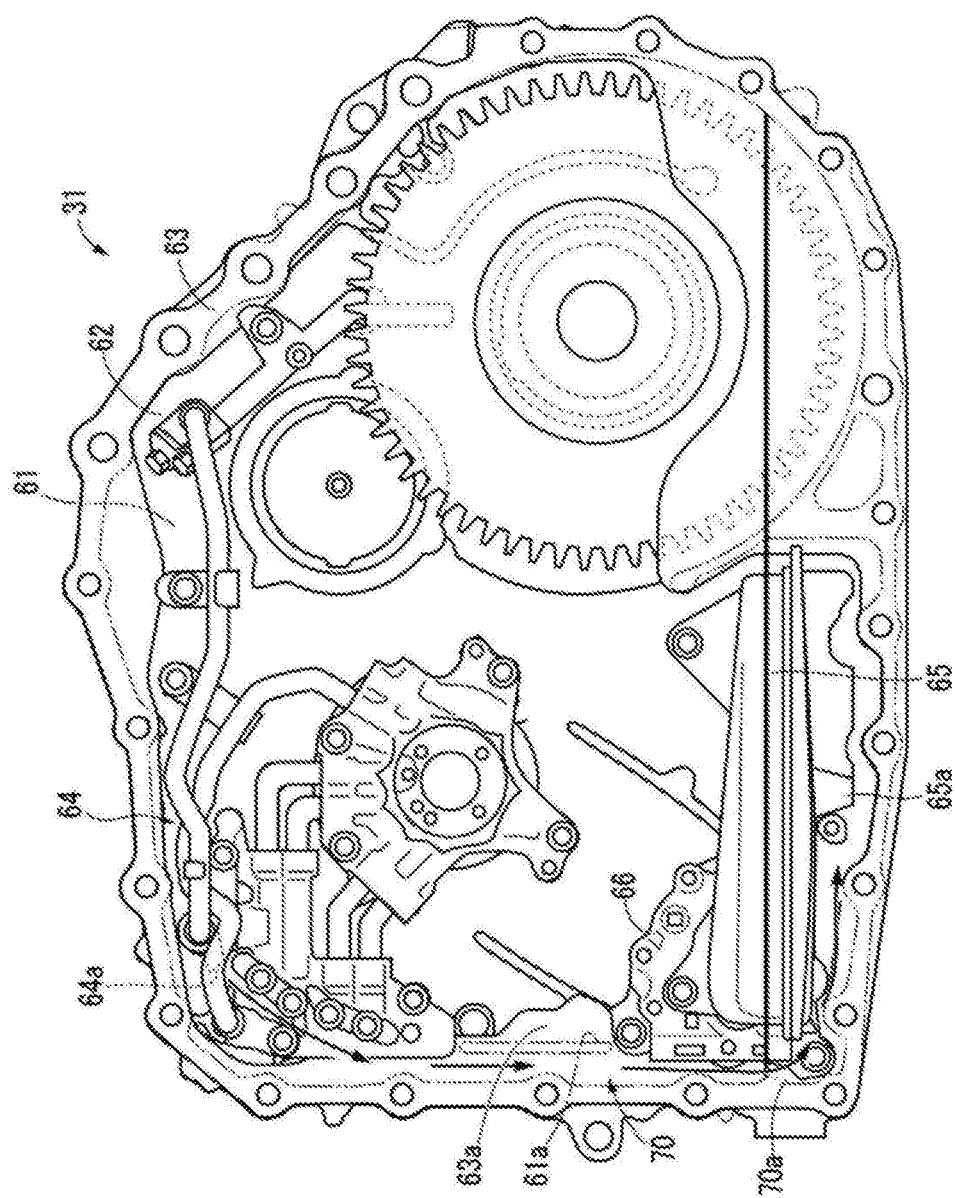
FIG. 8 is a side view illustrating a flow path in the transmission case of FIG. 5.

As illustrated in FIG. 8, in the flow path structure of the power transmission device PT, a flow path 70 is formed between the gasket 63 and the TC side case member 61 by an outer surface of the discharge mechanism 64, the extending portion 63*a* of the gasket 63, the rib 61*a* of the TC side case member 61, and an outer surface of the pump 66.

Next, the flow path 70 of the flow path structure will be described with reference to FIG. 8. Further, in FIG. 8, an oil surface (liquid surface) in the oil reservoir formed inside the transmission case 31 is indicated by a bold line. Also, a flow of the lubricating oil discharged from the discharge mechanism 64 is indicated by an arrow.

The flow path 70 extends from an upper portion of the transmission case 31 to a lower portion thereof and guides the lubricating oil discharged from the discharge port 64*a* of the discharge mechanism 64 to the oil reservoir formed below the transmission case 31.

Here, the discharge port 64*a* of the discharge mechanism 64 discharges the lubricating oil toward an inner surface of the flow path 70 (specifically, an outer surface of the discharge mechanism 64 which forms the flow path 70). Accordingly, since the discharged lubricating oil flows and moves along the inner surface of the flow path 70, gas is discharged from the lubricating oil during this movement.

Further, an opening (that is, a discharge end 70*a*) of the flow path 70 on the lower side is located below the oil surface in a state in which the oil surface of the oil reservoir is a horizontal surface. Therefore, since the lubricating oil discharged from the flow path 70 is guided without falling into the oil reservoir, foaming in the lubricating oil can be prevented when the lubricating oil reaches the oil reservoir.

As described above, in the flow path structure of the present disclosure, since the lubricating oil from the hydraulic operating mechanism is discharged from the discharge mechanism 64 toward the inner surface of the flow path 70, the discharged lubricating oil flows and moves along the inner surface of the flow path 70. Since the gas is discharged from the lubricating oil during such movement, the flow path 70 can obtain a sufficient defoaming effect while having a simple configuration.

Additionally, the flow path 70 is formed using the extending portion 63*a* of the gasket 63 (that is, using a part of an originally disposed member). Therefore, it is possible to minimize an increase in a size of the entire device as compared with a structure in which a separate and independent defoaming device is installed.

Therefore, according to the above-described flow path structure, it is possible to remove the gas from the lubricating oil guided to the oil reservoir while minimizing an increase in size of the entire power transmission device PT.

Although the illustrated embodiment has been described above, the present disclosure is not limited to such an embodiment.

For example, in the embodiment, the flow path 70 is formed between the gasket 63 and the TC side case member 61 by the outer surface of the discharge mechanism 64, the extending portion 63a of the gasket 63, the rib 61a of the TC side case member 61, and the outer surface of the pump 66. Use of these members to form the flow path 70 is to reduce the number of dedicated components used only for forming the defoaming device.

However, the flow path of the present disclosure may be formed only by the extending portion and the built-in components, or only by the extending portion and the casing. Further, the flow path may be formed by the extending portion having an L-shaped cross section without using the built-in components such as the pump and also omitting the rib for the flow path.

In the flow path structure of the disclosure, an opening (for example, a discharge end 70a in the embodiment. Hereinafter, it is the same) of the flow path on a lower side may be located below a liquid surface in a state in which the liquid surface in the fluid reservoir is a horizontal surface.

If the opening (that is, the discharge end) of the flow path on the lower side is located above the liquid surface in the fluid reservoir, the lubricating fluid drips from the discharge end to the liquid surface, and thus bubbles may be generated. Therefore, when the discharge end of the flow path is formed to be lower than the liquid surface in a state in which the liquid surface in the fluid reservoir is a horizontal surface, the lubricating fluid discharged from the flow path does not drip into the fluid reservoir but is guided. Therefore, it is possible to prevent foaming from occurring when the lubricating fluid reaches the fluid reservoir.

Further, in the flow path structure of the disclosure, a built-in component (for example, a discharge mechanism 64, a strainer 65, and so on. Hereinafter, it is the same) fonning the power transmission device may be disposed inside the casing, and the flow path may be formed in association with the extending portion, the casing and a built-in component.

In this way, when the flow path is formed using the casing of the power transmission device or the built-in component which is originally disposed inside the casing, it is possible to further reduce the number of dedicated components for forming the flow path, and thus it is easier to further suppress the increase in the size of the entire power transmission device.

Further, in the embodiment, the opening (that is, the discharge end 70a) of the flow path 70 on the lower side is located below the oil surface in a state in which the oil surface in the oil reservoir is the horizontal surface. This is to prevent bubbles from being generated in the oil reservoir by allowing the lubricating oil discharged from the flow path 70 to fall into the oil reservoir.

However, the flow path of the present disclosure is not limited to such a configuration. For example, even if the opening of the flow path on the lower side is located somewhat above the oil surface in a horizontal state, there is no problem as long as there is no risk of entraining air into the oil reservoir. Further, In the case in which the lubricating oil is discharged along a wall surface of the casing from the discharge mechanism, the lubricating oil does not fall even when the opening of the flow path is not located below the oil surface in the oil reservoir. Therefore, in such a configuration, the opening of the flow path on the lower side may be located above the oil surface.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A flow path structure of a power transmission device which removes gas from a lubricating fluid guided to a fluid reservoir inside a casing of the power transmission device, comprising:

a discharge mechanism configured to discharge the lubricating fluid supplied to a hydraulic operating mechanism disposed inside the casing into an inside of the casing, wherein the casing comprises a plurality of case members joined to each other at an opening edge of the casing, a gasket is interposed between the case members, the gasket has an extending portion configured to extend toward an inside of the casing from the opening edge, a flow path configured to extend from an upper portion of the casing to a lower portion thereof and to guide the lubricating fluid discharged from the discharge mechanism to the fluid reservoir is formed inside the casing and surrounded by the extending portion and an inner wall surface of the casing, and the discharge mechanism discharges the lubricating fluid toward the flow path.

2. The flow path structure according to claim 1, wherein:

an opening of the flow path on a lower side is located below a liquid surface in a state in which the liquid surface in the fluid reservoir is a horizontal surface.

3. The flow path structure according to claim 1, wherein:

a built-in component of the power transmission device is disposed inside the casing, and the flow path is formed in association with the extending portion, the casing and the built-in component.

4. The flow path structure according to claim 2, wherein:

a built-in component of the power transmission device is disposed inside the casing, and the flow path is formed in association with the extending portion, the casing and the built-in component.

5. A flow path structure of a power transmission device which removes gas from a lubricating fluid guided to a fluid reservoir inside a casing of the power transmission device, comprising:

a discharge mechanism configured to discharge the lubricating fluid supplied to a hydraulic operating mechanism disposed inside the casing into an inside of the casing, and a built-in component of the power transmission device, the built-in component being disposed inside the casing, wherein the casing comprises a plurality of case members joined to each other at an opening edge of the casing, a gasket is interposed between the case members, the gasket has an extending portion configured to extend toward an inside of the casing from the opening edge, a flow path configured to extend from an upper portion of the casing to a lower portion thereof and to guide the lubricating fluid discharged from the discharge mechanism to the fluid reservoir is formed inside the casing and surrounded by the extending portion and an outer surface of the built-in component, and the discharge mechanism discharges the lubricating fluid toward the flow path.

* * * * *